Figure 1:
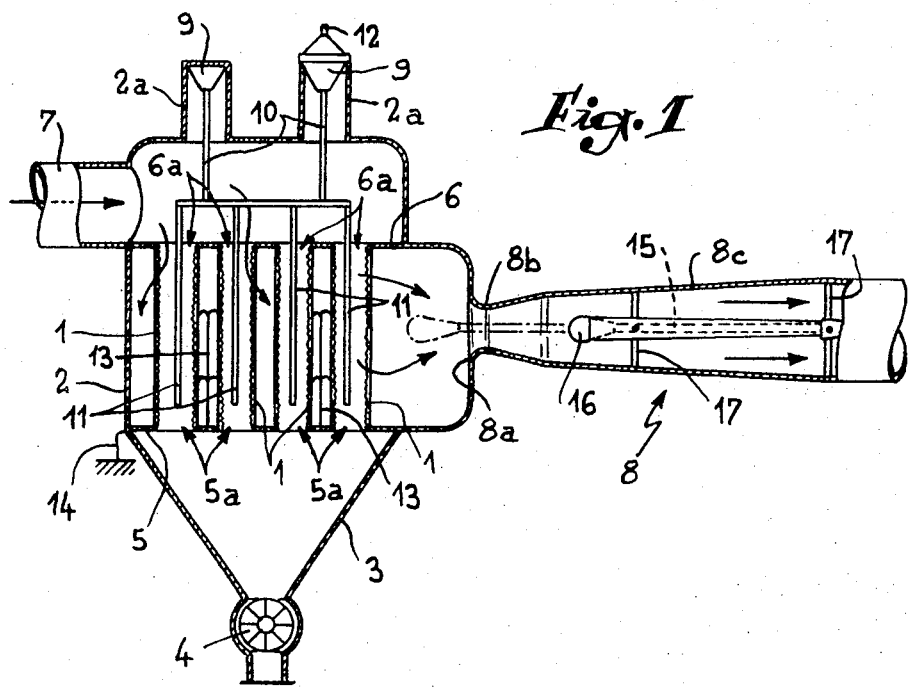

United States Patent [19]
Vicard

[11] 3,839,185
[45] Oct. 1, 1974

[54] FILTERING WALL FILTER

[76] Inventor: Pierre Georges Vicard, 15 Cours Eugenie, Lyon, France

[22] Filed: May 7, 1973

[21] Appl. No.: 358,091

[30] Foreign Application Priority Data
May 8, 1972  France .............................. 72.17717

[52] U.S. Cl...................... 204/307, 55/112, 55/131, 55/138, 55/152, 55/154, 55/272, 55/283, 55/286, 55/293, 55/341, 55/360, 55/DIG. 38, 210/243, 210/332
[51] Int. Cl.......... B03c 3/74, B03c 5/00, B03c 3/12
[58] Field of Search ............. 55/111, 112, 117, 131, 55/150, 151, 152, 154, 272, 273, 282, 283, 284, 291, 292, 293, 301, 302, 341, 417, 138, 286, 360, DIG. 38; 210/243, 332, 322, 323, 333, 334, 348, 354, 356, 407, 408, 409, 411, 412, 427; 204/164, 186, 302, 307

[56] References Cited
UNITED STATES PATENTS
| | | | |
|---|---|---|---|
| 1,398,685 | 11/1921 | Gordon | 55/293 |
| 1,931,436 | 10/1933 | Deutsch | 55/131 |
| 2,732,912 | 1/1956 | Young | 55/293 X |
| 3,158,455 | 11/1964 | Lincoln | 55/341 X |
| 3,169,038 | 2/1965 | Pendleton | 302/59 |
| 3,182,977 | 5/1965 | Erni | 261/DIG. 54 |
| 3,368,328 | 2/1968 | Reinauer | 55/96 |
| 3,373,545 | 3/1968 | Christianson | 55/273 |
| 3,431,709 | 3/1969 | Kawanami | 210/323 X |
| 3,577,705 | 5/1971 | Sharlit | 55/465 X |
| 3,726,065 | 4/1973 | Hausberg et al. | 266/31 X |

FOREIGN PATENTS OR APPLICATIONS
903,890  2/1954  Germany .............................. 55/341

Primary Examiner—Dennis E. Talbert, Jr.
Attorney, Agent, or Firm—Arthur E. Dowell, III

[57] ABSTRACT

A filtering wall filter for liquid or gaseous fluids, of the type in which the fluid flow passage comprises a venturi, the said filter being provided with means for instantaneous closing of the fluid passage at the throat of the venturi to convert the high kinetic energy of the fluid at this point to a vibration energy capable of being transmitted to the filtering walls to unclog the said walls.

4 Claims, 2 Drawing Figures

FILTERING WALL FILTER

DESCRIPTION OF THE INVENTION

A known method of separation of foreign particles in suspension on a liquid or gas comprises the use of filtering walls through which the fluid can flow but retaining the particles, at least those above a certain dimension. A considerable number of such flexible or rigid filtering walls acting alone because of their porous structure, or provided with an active layer of suitable deposited particles, etc., have been suggested for this purpose.

Three technical difficulties arise in all cases where filters of this type are used:
1. After a variable time of operation the filtering wall must be cleared of the highly adhesive retained impurity layer;
2. Since the ratio between vacancy and solid areas is relatively low in most filtering walls considerable areas must be employed to provide for sufficient flow without unacceptable pressure drops; and
3. In the case of electrically insulating fluids the particles to be eliminated are almost always carriers of electric charges resulting in electrostatic phenomena which are very difficult to suppress.

The object of the invention is to eliminate the above disadvantages.

According to the invention a filtering wall filter for liquid or gaseous fluids of the type in which the fluid flow passage comprises a venturi comprises means permitting instantaneous closing of the flow passage at the throat of the venturi to convert the high kinetic energy at that point to vibratory energy capable of being transmitted to the filtering walls to unclog them.

Figure 2:
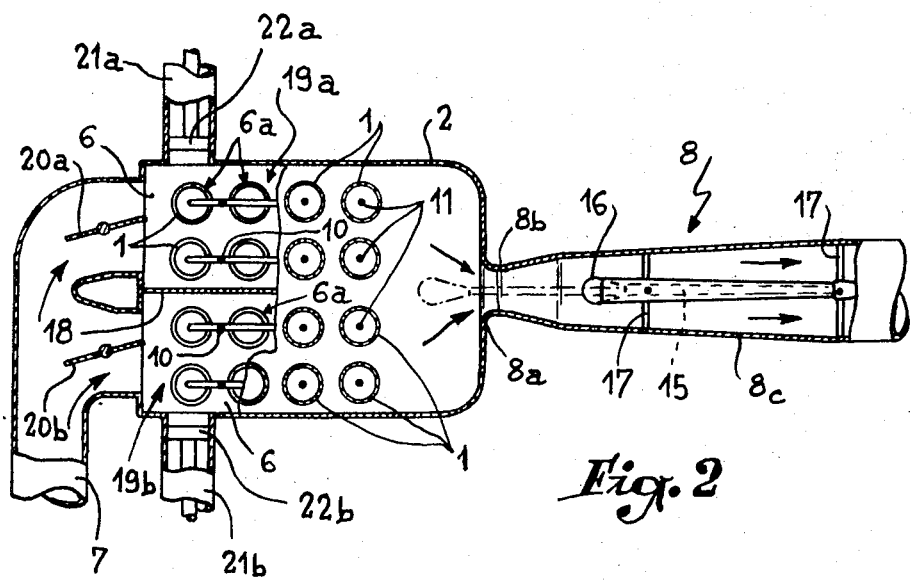

In the attached drawing:

FIG. 1 is a diagrammatic vertical section of a first embodiment of a bag gas filter according to the invention, and FIG. 2 is a horizontal section of another embodiment.

The gas filter represented in FIG. 1 is a bag type filter, i.e., the filter elements consist of a number of pockets 1, for example of cylindrical shape, made of a porous but very tight fabric permitting passage of the gas but retaining the majority of the particles contained therein. The said pockets or bags 1 are arranged inside a casing or house 2 extended downward by a collector hopper 3 provided with a bottom outlet gate or lock 4.

The open bottom ends of bags 1 are fixed by any suitable means to the edges of openings 5a provided in a horizontal wall 5 separating casing 2 from hopper 3. The upper ends of the bags are open also and fixed by similar means to the openings 6a of a second horizontal wall 6 arranged in casing 2 above the said wall 5. The gas to be filtered flows from a pipe 7 into the chamber located above wall 6 in casing 2, through bags 1, and into the space surrounding the said bags between walls 5 and 6. The gas flows out through a horizontal nozzle 8 comprising a short convergent portion 8a, a throat 8b, and a substantial length divergent portion 8c, as in a venturi.

The top wall of casing 2 is provided with stacks 2a closed by insulators 9 supporting rods 10 from which a system of vertical electrodes 11 arranged axially in the bags is suspended. Electrodes 11 are not provided with points, projections, or portions of short radius of curvature capable of initiating a corona discharge resulting from the ionization of the gaseous medium. One of rods 10 extends beyond its insulator 9 to form an external input terminal 12.

Bags 1 are made of an electrically conductive material or of a material treated to obtain conductive properties. They are grounded at intermediate points by conductors such as 13 if their conductivity is not sufficient to provide for the operation described below. Casing 2 is made of conductive material (metal) and grounded as indicated at 14.

A linear motor 15, i.e., a pneumatic motor, is mounted on the axis of the divergent portion 8c of nozzle 8. The end of the rod of the said motor carries a plug 16 in the form of a streamlined body of revolution whose maximum diameter approximates very closely the internal diameter of the throat 8b of the nozzle. Motor 15 is fixed as shown by preferably streamlined radial arms 17. To provide for appropriate contact between plug 16 and the periphery of the motor in the retracted position without turbulence the portion of the cylinder of the said motor beyond the bottom through which the rod extends is shaped so that the plug engages the resulting tubular extension as shown by the solid line, and is adapted to the streamlined shape of the unit. The motor stroke is determined so that, in the retracted position, plug 16 is located in the divergent portion 8c at a distance from throat 8b sufficient not to interfere with the gas flow, and that, in the extended position, the said plug is located at a suitable distance ahead of the throat in convergent portion 8a, or even inside casing 2 as indicated by the dot and dash lines.

The system operates as follows:

It will be assumed that the particles in suspension in the treated gas are already electrically charged, for example negatively. In this case the electrodes are supplied a high potential of the same sign as the particles, i.e., negative.

It will be observed that in the operative condition moving plug 16 is in the position indicated by the solid line.

Thus, because of their smooth structure electrodes 11 have no substantial ionizing effect. Their function is only to act by electrostatic induction on the walls of bags 1 to polarize them positively, the negative charges being dissipated by grounding. In these conditions the negatively charged particles in suspension in the gas are repelled by the electrodes and attracted by the said walls. Therefore, the particles tend to deposite as agglomerates on the solid portions of the filtering surface, and not opposite the vacancies.

This selective fixation of the particles on the filtering surfaces provides the advantage of permitting larger apertures or pores therein. Therefore, bags 1 may consist of sheets provided with apertures or slots of substantial size to reduce considerably the charge losses, and therefore provide for higher outputs, all other conditions being the same.

After some time of operation, long before the filter shows signs of clogging, motor 15 is operated to move plug 16 forward once and return it to a position intermediate between the solid line (retracted position of the motor) and the dot and dash line position (extended position of the motor). On each of the two passages through throat 8b plug 16 blocks the flow of gas so that the dynamic energy thereof at the throat is converted to high vibratory energy which, transmitted at the speed of sound, impinges upon bags 1, vibrates them, and therefore causes sliding of the particle agglomerates into hopper 3.

It will be understood that if motor 15 is operated periodically at sufficiently short intervals, at the time of vibration of the bags the particles have not had enough time to cling extensively to the pores of the filtering surface. The agglomerates formed by the particles are retained only by true mechanical fixation at least in some of the pores. Consequently, sliding thereof on the wall entails no difficulty.

It is important to observe that the rapid passage of the plug through the throat stops the gas flow only during a time much too short to alter the continuous flow substantially. In fact, because of the speed of operation of the motor, the plug prevents flow of only a very small volume of gas, and it is conceivable that in these conditions its operational frequency can be very high, for example, about two actions per minute, which permits particle elimination for the above cited reasons. It will be observed also that in the two end positions, and more particularly in the inoperative position indicated by the solid line, shaped plug 16 does not interfere with the gas flow.

Motor 15 may be controlled by any suitable method, for example, as a function of time or of the volume of gas that has passed through the filter since the last operation, in accordance with a predetermined program, etc. It may be operated several times on each action.

A particularly interesting arrangement comprises a filter consisting of a plurality of units of the kind represented in the attached drawing, each provided with a venturi, a motor or drive, the motors being operated synchronously but with a slight shift [sic]. Appropriate selection of the shift provides for interference effects between the vibration emissions of the different units, which affects favorably the dislocation and sliding of the particle agglomerates in particularly difficult cases.

It may be observed also that the arrangement of the venturi and the filter bags along the gas path may be reversed. Thus, for example the direction of gas flow can be reversed, and then the bags are made sufficiently rigid to permit flow from the outside to the inside. The venturi can be mounted at the filter inlet, etc.

When the electric charge of the particles in suspension in the fluid is not substantial the said particles are electrified by electrostatic induction near electrodes 11. Although reduced the favorable effect of the electric field is preserved. In these cases it appears preferable for higher efficiency to precharge the particles by ionization. For this purpose special ionization electrodes can be utilized and placed, for example, in pipe 7, but it is simpler to provide axial electrodes 11 with points or other sharp edges so that they can act both as ionization electrodes and as polarization electrodes.

Conceivably, also, in some particular cases, only the venturi and moving plug arrangement may be used, the filtering occuring without the action of electrodes 11. This is the case when the particles tend naturally to form agglomerates adhering only weakly to the filtering walls.

FIG. 2 is a horizontal section of another embodiment in which the plane of the section extends directly above the inlet of bags 1 on the left side of the figure, and through the axis of venturi 8 on the right side. The same reference symbols as in FIG. 1 are used in this figure to designate the same elements. The differences from the embodiment of FIG. 1 are as follows:

First, the space in casing 2 above horizontal wall 6, i.e., the gas inlet chamber, is divided by a vertical wall 18 into two separate chambers 19a and 19b connected to pipe 7 by individual valves 20a and 20b.

Second, each side wall of each of the said chambers is provided with a pulsating system consisting in the example represented of a cylinder 21a, 21b opening in the corresponding chamber and containing a piston 22a, 22b reciprocated rapidly by any suitable means (not represented).

Before motor 15 and plug 16 are started one of valves 20a, 20b is closed to isolate one of chambers 19a, 19b and the bags 1 contained therein from inlet pipe 7. In these conditions no gas flows through the said bags and their walls are slack. When plug 16 passes through the throat of venturi 8 the vibration wave generated in this manner propagates inside casing 2, consequently reaches the slack wall bags and act thereon with more strength and efficiency than on bags in which a gas flows and whose walls are under tension.

Pulsating systems 21a, 22a and 21b, 22b may operate continuously or discontinuously. Regardless of the operation they determine vibration waves transmitted to the bags and contributing to the separation of the amassed particles therefrom. The efficiency of these systems may of course be increased considerably by operating at the frequency of resonance of the gas material inside the apparatus. The position of these systems in the apparatus may vary, and they can be mounted on the walls of casing 2 under wall 6.

It is understood that the number of chambers such as 19a and 19b may vary in different cases. Only one chamber may be provided if the filtering operation is interrupted during the operation of the motor.

The invention is applicable not only to gases but also to liquids, provided only that the liquids be electrically insulating. The structure of the filtering walls may vary (flat plate filters, for example). The venturi may be oriented in any direction, and arranged at the fluid inlet instead of at the outlet.

I claim:

1. A filtering wall filter for a fluid comprising a housing having an inlet and an outlet for fluid to be filtered;

at least one filtering wall disposed within said housing between said inlet and said outlet in such a manner that fluid passing from said inlet through said housing to said outlet passes through at least one of said filtering walls;

said outlet being a Venturi through which said fluid passes, said Venturi having an upstream converging conical portion, a neck and a downstream conical diverging portion, with the angle of conicity of said downstream diverging portion being much lower than the angle of conicity of said upstream converging portion, said Venturi further having a longitudinal axis;

a movable plug having such a diameter as the substantially obturate said Venturi when disposed in the neck thereof;

and means to displace said plug from a first position situated within one of said conical portions through said neck to a second position situated within the other one of said conical portions each of said first and second positions being situated at such a distance from neck that free passage of said fluid through said Venturi is not hindered by said plug when same is at any of said first and second positions.

2. In a filtering wall filter as claimed in claim 1, said means to displace said plug comprising a pneumatic ram disposed substantially along the axis of said Venturi within one of said conical portions at a distance from said neck, said ram including a movable rod with said plug being carried by said rod.

3. In a filtering wall filter as claimed in claim 2, said ram having an end through which said rod extends, said plug being aerodynamically conformed with respect to the gas flowing through said Venturi, and said end of said ram being formed with a recess to receive a portion of said plug at one of the ends of the stroke of same.

4. A filtering wall filter for a fluid containing particles in suspension, comprising a housing having an inlet and an outlet for fluid to be filtered;

at least one filtering wall disposed within said housing between said inlet and said outlet in such a manner that fluid passing from said inlet through said housing to said outlet passes through at least one of said filtering walls;

said outlet being a Venturi through which said fluid passes, said Venturi having an upstream converging conical portion, a neck and a downstream conical diverging portion, with the angle of conicity of said downstream diverging portion being much lower than the angle of conicity of said upstream converging portion;

a movable plug having such a diameter as to substantially obturate said Venturi when disposed in the neck thereof;

means to displace said plug from a first position situated within one of said conical portions through said neck to a second position situated within the other one of said conical portions, each of said first and second positions being situated at such a distance from said neck that free passage of said fluid through said Venturi is not hindered by said plug when same is at any of said first and second positions;

and polarization and ionization electrodes to electrify the particles in suspension in said fluid in the vicinity of said filtering walls.

* * * * *